No. 775,483. PATENTED NOV. 22, 1904.
G. H. WHITEHOUSE.
ADJUSTABLE LEVEL.
APPLICATION FILED SEPT. 17, 1903.
NO MODEL.
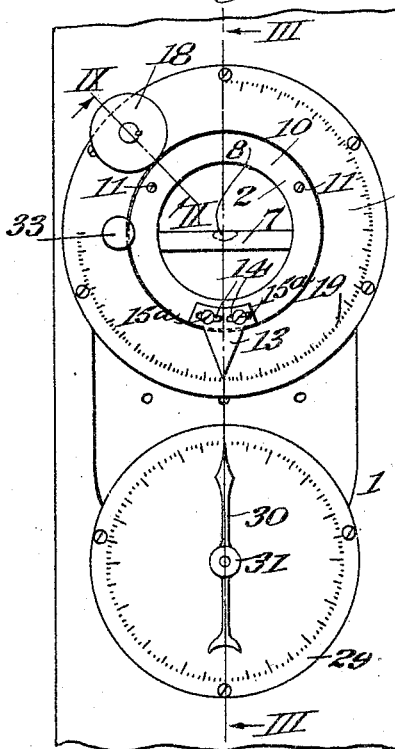
Fig. I
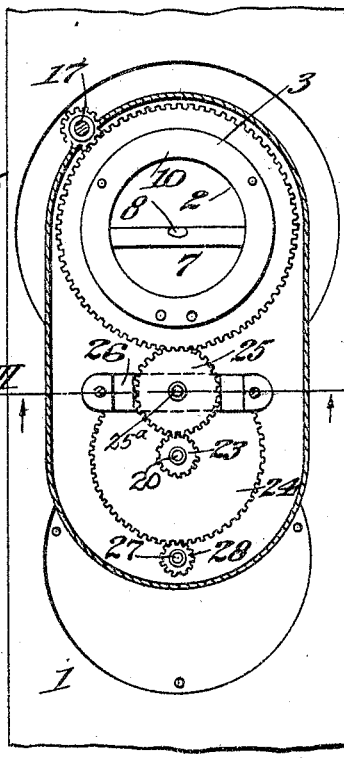
Fig. II
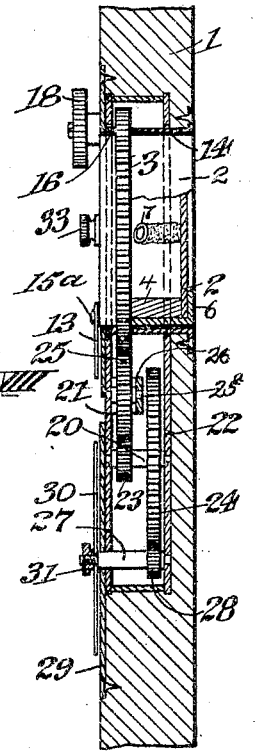
Fig. III
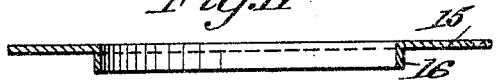
Fig. IV
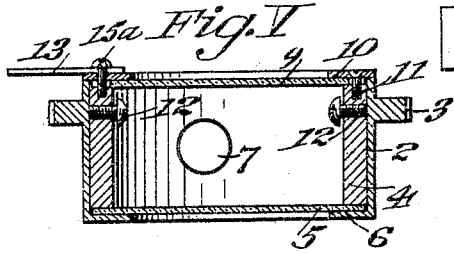
Fig. V
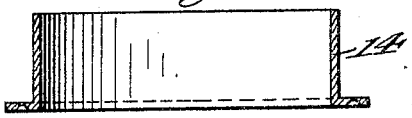
Fig. VI
Fig. VII
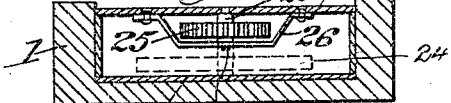
Fig. VIII
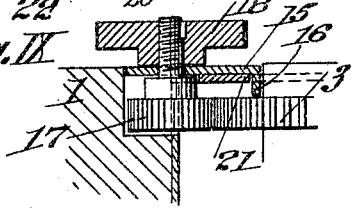
Fig. IX
Witnesses
Edmund A. Strauss
A. P. Knight
Inventor
George H. Whitehouse
by George T. Hackley
his atty.

No. 775,483. Patented November 22, 1904.

UNITED STATES PATENT OFFICE.

GEORGE H. WHITEHOUSE, OF SEATTLE, WASHINGTON.

ADJUSTABLE LEVEL.

SPECIFICATION forming part of Letters Patent No. 775,483, dated November 22, 1904.

Application filed September 17, 1903. Serial No. 173,600. (No model.)

*To all whom it may concern:*

Be it known that I, GEORGE H. WHITEHOUSE, a citizen of the United States, residing at Seattle, in the county of King and State of Washington, have invented a new and useful Level, of which the following is a specification.

This invention relates to levels adapted to be used for all purposes for which ordinary levels are used and which possesses features allowing it to be used for indicating angles from a horizontal or vertical or for determining grades.

The main object of the invention is to provide indicating devices by means of which an extremely delicate adjustment may be secured.

Another object is to provide means whereby the indicating devices may be adjusted.

Other objects of the invention are to provide a level of the character described which is simple in construction, effective in operation, and durable in use and applicable to numerous purposes, which readily suggest themselves to mechanics.

The invention is of great use to carpenters, masons, shipwrights, and others.

The accompanying drawings illustrate the invention, and, referring to the same, Figure I is a plan view of a portion of the beam and embraces the bulb-glass, bulb-frame, and other parts comprising the invention. Fig. II is a view similar to Fig. I with the dials removed and the gear-casing shown in section. Fig. III is a sectional view taken on line III III, Fig. I. Fig. IV is an enlarged diametrical section through the bulb dial-plate. Fig. V is a diametrical section, enlarged, taken through the bulb-frame. Fig. VI is an enlarged diametrical section through the bulb-frame sleeve. Fig. VII is a plan view of the level complete. Fig. VIII is a transverse section on line VIII VIII, Fig. II. Fig. IX is an enlarged detail view in section on line IX IX, Fig. I.

1 designates the beam, which may be of any preferred material.

2 is the bulb-frame, which is cylindrical in form and which is provided with an annular gear 3.

4 is a bulb-ring which is nested within the bulb-frame 2, its lower edge resting upon a plate 5, which is supported by a flange 6, directed inwardly from the lower portion of the bulb-frame 2.

The bulb-ring 4 carries a bulb-tube 7, which is provided with a sight 8. One wall of the bulb-tube 7 lies along a line drawn through the diameter of the bulb-frame. The bulb-tube 7 may be cemented in the ring, as shown, or fastened thereto in any other desired manner and is protected by a glass plate 9, which rests upon the upper rim of the bulb-ring 4 and being held thereon by means of a ring 10, screws 11 being provided, which pass through the ring 10 and the glass 9 into the bulb-ring 4.

The bulb-ring 4 may be frictionally held adjustably within the bulb-frame by clamping-screws 12. An indicator 13, having elongated slots 14, may be attached to the bulb-ring by screws $15^a$, which pass through the elongated slots. By loosening the screws $15^a$ the indicator 13 may be adjusted in case the level gets out of true.

14 is a thimble in the beam 1, and the hub-frame is revolubly mounted within the thimble 14, the annular gear 3 resting upon the upper rim of the thimble 14.

15 is a ring provided with a downwardly-directed flange 16, which is secured to the upper face of the beam, and the flange 16 rests upon the upper face of the annular gear 3.

17 is a pinion which meshes with the annular gear 3 and which may be revolved by means of a thumb-nut 18.

The bulb-ring may be revolved easily, as there is a minimum of friction between the annular gear and the thin edges of the thimble 14 and flange 16.

The upper face of the ring 15 is suitably graduated.

It is obvious that if the indicator 13 is positioned as shown in Fig. I that the line of the bulb-tube will be perpendicular to the edge of the beam, and when the bulb-tube is thus positioned the level is adapted to be used in obtaining a plumb.

By positioning the pointer ninety-five degrees from the position shown in the drawings the level may be used for horizontal work. The pointer may be moved to any position on the ring and clamped when it is desired to set the instrument for definite slopes or inclinations.

20 is a shaft mounted in plates 21 and 22 and carries gears 23 and 24.

25 is an intermediate gear on a pivot 25ª, which is supported by a bracket 26, depending from the plate 21 and which meshes with gears 23 and 3.

27 is a shaft mounted in bearings in plates 21 and 22, which carries a gear 28, the latter meshing with the gear 24.

The shaft 27 extends up through the plate 21 and through the center of a fractional dial 29, which is screwed to the upper face of the beam. The shaft 27 on its upper end carries a hand 30, which may be adjustably secured to a shaft 27 by a nut 31.

The gearing intermediate of the annular gear and the gear 28 is so proportioned that when the indicator 13 is moved over a division corresponding to one inch to the foot that the hand 30 will make a complete revolution over the dial 32.

33 is a clamping-screw which takes against the bulb-ring 4 and holds the same in position after it has been set as desired.

What I claim is—

A beam, a thimble therein, a bulb-frame having an annular gear, the gear resting on the upper edge of the thimble, a bulb-ring nested within the bulb-frame, a bulb-tube in the bulb-ring, a transparent cover or plate over the bulb-frame, a ring over the edge of the plate, a dial having a downturned flange resting on the upper edge of the annular gear, a fractional dial, gearing connecting the fractional dial with the annular gear, a hand for the fractional dial and an indicator for the first-named dial, the gearing being proportioned to give a complete revolution of the hand over the fractional dial for a movement of the bulb-frame which brings the indicator on the bulb-frame over the space between two adjoining graduations on the first dial.

Signed at Seattle, in the county of King and State of Washington, this 13th day of August, 1903.

GEORGE H. WHITEHOUSE.

Witnesses:
 HARRY G. NAURTE,
 MEDARD A. EMARD.